April 16, 1929.     R. C. LANPHIER ET AL     1,708,972
ELECTRICITY METER
Filed June 14, 1922     3 Sheets-Sheet 1

April 16, 1929.　　R. C. LANPHIER ET AL　　1,708,972
ELECTRICITY METER
Filed June 14, 1922　　3 Sheets-Sheet 2

April 16, 1929.  R. C. LANPHIER ET AL  1,708,972
ELECTRICITY METER
Filed June 14, 1922   3 Sheets-Sheet 3

Witness
Milton Lenoir

Inventors
Robert C. Lanphier,
Frederick C. Holtz,
Adams & Jackson
Attorneys.

Patented Apr. 16, 1929.

1,708,972

UNITED STATES PATENT OFFICE.

ROBERT C. LANPHIER AND FREDERICK C. HOLTZ, OF CHICAGO, ILLINOIS, ASSIGNORS TO SANGAMO ELECTRIC COMPANY, OF SPRINGFIELD, ILLINOIS, A CORPORATION OF ILLINOIS.

ELECTRICITY METER.

Application filed June 14, 1922. Serial No. 568,325.

Our invention has to do with the measurement of forces, velocities etc. which require vector addition rather than arithmetical addition, as presented, for example, in the problem of integrating two vector quantities, which, while they may have a fixed direction with respect to each other, are both continuously increasing functions of a third variable such as time, etc., but more specifically it has to do with the measurement of energy of alternating current circuits, where it is highly desirable to integrate the apparent electric power supplied. In recent years it has become more and more important that distributors of electric energy have some means of measuring the kva. demand of a power customer instead of the kw. demand, for reasons which are well understood by those familiar with the art, but so far as we are aware, prior to our present invention no one has devised a commercially practicable meter suitable for that purpose. To meet the requirements of such use an instrument must be capable of integrating a quantity of the form $$\sqrt{A^2+B^2}dt,$$

where A represents the true power supplied, B the reactive component of apparent energy or wattless power supplied, and $dt$ represents a small time interval. In this case A $dt$ is evidently a vector moving in a given direction and changing from time to time as a function of the time, and B is a vector moving at right angles to vector A and also varying with the time, the algebraic sum of these vector quantities being indicated vectorially by a line A—B which forms the hypothenuse of the right angle triangle formed with the lines A—B.

The object of our present invention is to provide a demand meter which will record vectorially in terms of kva. hours the apparent electric energy, true energy, and quadrature component of apparent energy over a given period, and by this means will establish such values as average apparent power, average true power, average quadrature component power, and average power factor over the same period. This object we accomplish as illustrated in the acompanying drawings and as hereinafter described. What we regard as new will be set forth in the claims. In this connection it should be understood that while in the embodiment of our invention illustrated the apparatus is designed for the measurement of the apparent energy of a polyphase alternating current circuit, such apparatus may be used for any other purpose and in any other situation to which it is adapted, as the generic features thereof are not limited in their application to the use mentioned.

In the accompanying drawings,—

Figures 5, 8:
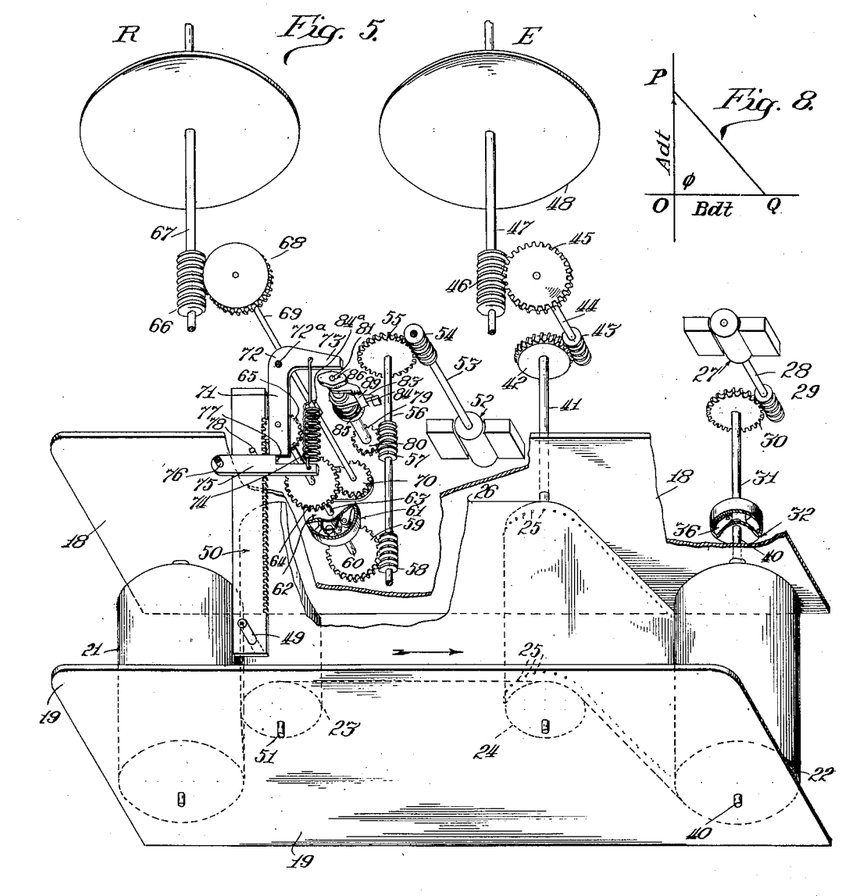
Fig. 8 is a vector diagram.
Figure 6:
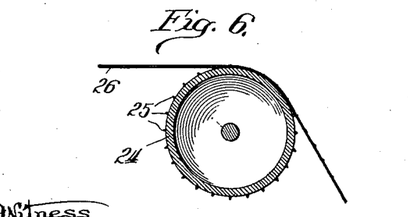
Fig. 6 is a cross-sectional view of what may be termed the escapement cylinder which controls the progress of the tape or record strip.
Figure 7:
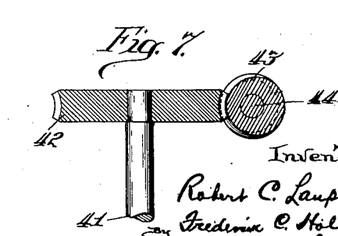
Fig. 7 is a sectional view of one of the worm wheels and worms which form a part of the driving mechanism.

Before entering upon a detailed description of our improved apparatus, it might be well to explain briefly the principle which it is designed to apply. Referring to the vector diagram of Fig. 8, let it be assumed that two vector quantities in the same plane start at a given instant to from some point O, one moving in the direction O Q and with a velocity which is a function of the time T, and the other moving at an angle from O Q in the direction O P, and such that the length O P is constantly increasing as some function of the time T. It will then be apparent that at a time $dt$ after starting we have the two values O P and O Q, and their difference P Q, which is also a vector quantity whose length and direction are constantly changing with the time, and which represents the approximate integral or vector difference of the two vectors O P and O Q over the time $dt$. It will also be apparent that by repeating this operation over successive small increments of time for any desired length of time the summation of the several vector quantities P Q represents the aggregate value or vector difference of the several vector quantities O P and O Q during each of the several small increments of time. This result may be represented by the equation $$\sum_{1}^{n} PQ = P_1 Q_1 + P_2 Q_2 + P_3 Q_3 + P_n Q_n$$

where $P_1 Q_1$ represents the value of P Q during the first interval of time, $P_2 Q_2$ represents that during the second interval, &c. It will be obvious to those skilled in the art that $\sum_{1}^{n} P Q$ will represent as close an approximation as is desired to the true integral of the two vector quantities.

In our pending application, Serial No. 347,385, for methods of and apparatus for integrating vector quantities, filed December 26, 1919, we have illustrated and described an apparatus by which such measurements may be made and recorded, and while our present invention in some respects embodies the same fundamental principles, it embodies a number of generic features of improvement which contribute largely toward making it a commercially practicable and sucessful instrument for the required purpose. The nature of these improvements will appear from the description of the apparatus illustrated, which, however, is only one form in which our invention may be embodied, and it should be understood that we do not limit ourselves to the specific construction shown and described, as many modifications thereof may be made without departing from our invention as claimed.

The apparatus illustrated comprises two polyphase watt hour meters, E, R, one of which, E, is arranged to operate at a speed proportional to the true power delivered, and the other of which, R, is designed to operate at a speed which is proportional to the reactive component of the apparent energy or wattless power supplied. These two polyphase meters serve as controllers or escapement devices to regulate respectively the movement of measuring devices which make the measurements represented by the lines O—Q and O—P shown in the vector diagram of Fig. 8. The power for actuating these measuring devices is supplied by suitable constant speed motors which operate independently of the polyphase meters, so that the latter are not taxed with the burden of actuating such measuring devices, and consequently their accuracy as meters is not impaired. This feature of using the polyphase meters merely as controllers or governors in connection with measuring devices actuated by constant speed motors which operate independently of the meters is mentioned at this time because it is an important feature of our invention and it will conduce to an understanding of the explanation of the apparatus as a whole to bear in mind this function of said meters.

Our improved machine is designed to record on a movable record element, which in the present instance is in the form of a tape or strip of paper, a series of lines made during successive equal time intervals, each of which lines represents the vector quantity P Q, this being accomplished by advancing the tape at a rate proportional to the true energy measured by one of the polyphase meters, meanwhile making a record on said tape by means of another record element, which in this instance is in the form of a stylus which is moved in a direction at right angles to the line of movement of the tape at a rate proportional to the reactive component of the apparent energy measured by the other polyphase meter, or vice versa. The stylus is reset to its initial position at the end of equal time intervals, which may be of any desired length, and consequently, in the arrangement illustrated, during any one of such time intervals the stylus will mark on the tape a diagonal line corresponding with the line P—Q of the diagram Figure 8. The tape will, therefore, furnish a record covering the whole period of the operation of the meter showing the several vector quantities P Q during successive intervals, from which the desired calculations may readily be made. The tape and stylus are respectively advanced by mechanism actuated by two independent constant speed motors, preferably electrically operated, although any other equivalent motors may be used, which motors are designed so that they tend to advance the tape and stylus faster than if they were directly moved by the polyphase meters, and said meters are used only after the manner of escapement devices to release the tape and stylus and permit them to advance at rates proportionate respectively to the measurements made by said meters. The extent of movement of the tape or stylus during any interval is, therefore, directly proportional to the quantity measured during such interval by the polyphase meter with which such member is connected.

Referring now to the drawings, we shall describe in detail the embodiment of our invention therein illustrated, which is merely typical of various ways in which the same may be applied to practical use.

Figure 1:
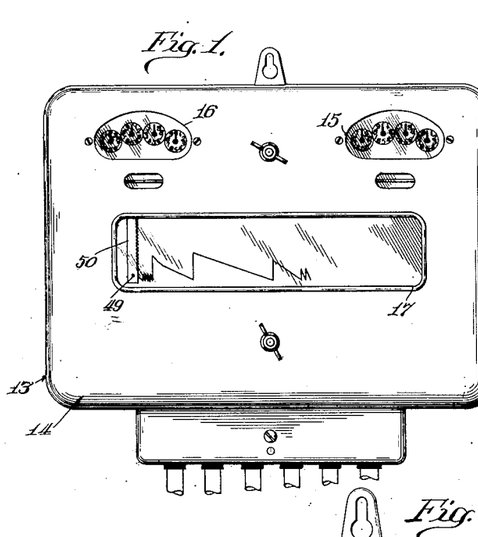
Fig. 1 is a front elevation of our improved kva. demand meter.
Figure 2:
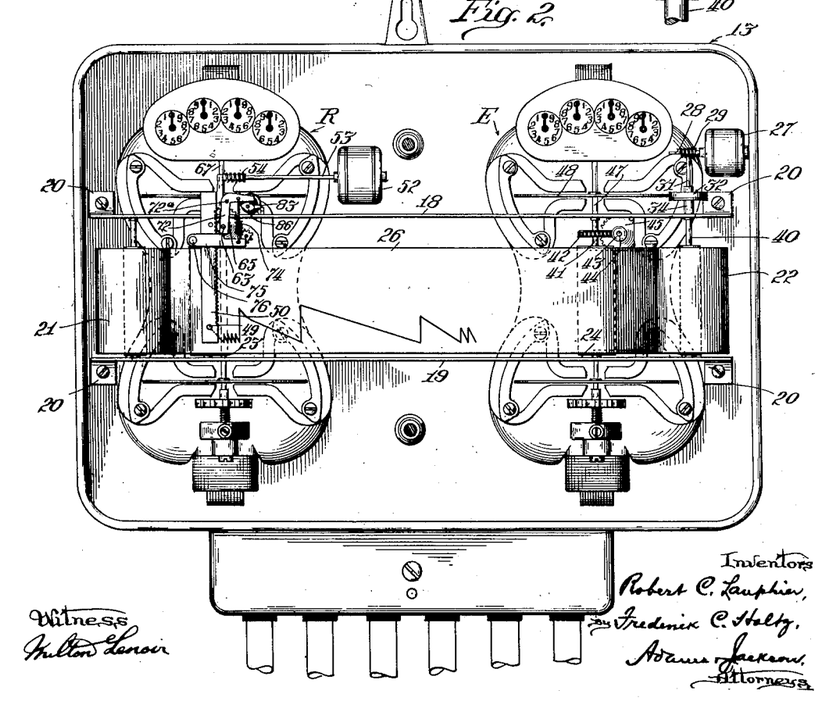
Fig. 2 is an enlarged front elevation thereof, the cover of the case being removed.

As shown in Figs. 1 and 2, the meter comprises a case 13 of suitable shape and dimensions to enclose the operating parts, including two polyphase meters, E, R, the meter E, in the illustrated arrangement, being that which registers true energy consumption, and the meter R that which registers the reactive component of the apparent energy. These two polyphase meters are arranged side by side in the case, which is provided with a cover 14 having sight openings 15, 16 to expose the dials of the meters, and also an elongated rectangular sight opening 17 which exposes the record made on the moving tape hereinafter described.

Figures 3, 5:
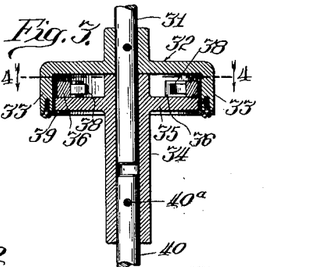
Fig. 3 is a detail, being a vertical section of one of the friction clutches which enter into the construction of the driving mechanism.
Fig. 5 is an isometrical perspective view illustrating the operating parts of the apparatus.
Figure 4:
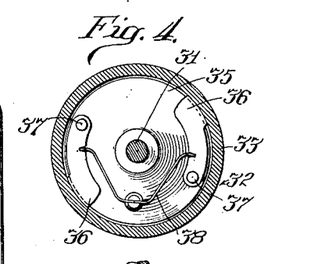
Fig. 4 is a horizontal section on line 4—4 of Fig. 3.

Mounted within the case and extending horizontally across in front of both meters is a frame comprising two parallel plates 18, 19 spaced apart and secured in fixed relation to each other in any suitable way, as for example, by securing them to the back of the case, as shown at 20 in Fig. 2. Mounted between these two plates at opposite ends thereof are two cylinders or rolls 21, 22, the cylinder 21 being adapted to contain an unused roll of tape, while the cylinder 22 operates as a rewinding cylinder to reel up the tape and draw it across the machine over guide rollers 23, 24. The guide roller 23 serves also as a platen to support the tape while a record is made thereon by the stylus hereinafter described, and the guide roller 24 performs the additional function of checking the progress of the tape, or regulating its rate of travel so that it will be proportional to the current measured by the polyphase meter E. To this end the roller 24 is provided on its periphery near its ends with a series of radial pins 25 adapted to perforate the marginal portions of the tape so that the tape cannot move faster than the surface speed of the cylinder 24. 26 indicates the tape which, as shown in Fig. 5, travels over the cylinders 23, 24 in the direction indicated by the arrow thereon. The power for moving the tape is supplied by a small constant speed electric motor 27, the armature shaft 28 of which is provided with a worm 29 which meshes with a worm wheel 30 carried by a shaft 31, as shown in Fig. 5. The shaft 31 is provided with a fixed friction clutch member 32 in the form of a disc having a laterally projecting marginal flange 33, as shown in Fig. 3. This clutch member is adapted to cooperate with a clutch member comprising a sleeve 34 which is loosely mounted on the shaft 31 adjacent to the clutch member 32, and is provided with a radial disc 35 which carries two shoes 36 pivoted to the marginal portion thereof at diametrically opposite points by pivots 37, the arrangement being such that said shoes are adapted to swing outward into engagement with the inner surface of the flange 33. A spring 38 serves to press said shoes outward into operative engagement with said flange. The clutch member 34 is held in operative relation to the clutch member 32 by a ring plate 39 secured to the margin of the flange 33 so as to overlap the outer portion of the disc 35, as shown in Fig. 3. Power is communicated to the cylinder 22 from the clutch member 34 by a shaft 40 which fits into the sleeve 34 and is non-rotatably secured thereto, as by a pin 40ª. From the foregoing description it will be seen that the constant speed motor 27 will apply constant torque to the rewinding cylinder 22, and if the tape were free to move it would travel at a rate proportionate to the speed of the motor 27. As has been explained, however, the tape cannot move faster than the surface speed of the cylinder 24, and the friction clutch mechanism is provided to compensate for the greater speed of the shaft 31 by permitting slippage between said shaft and the shaft 40.

The rate of rotation of the checking cylinder 24 is controlled from the polyphase meter E by means of a shaft 41 on which said cylinder is mounted, which shaft is provided with a worm wheel 42 which meshes with a worm 43 carried by a shaft 44, the latter shaft being connected with the motor mechanism of the meter by a worm wheel 45 which meshes with a worm 46 carried by the spindle 47 of the meter on which the usual discs 48 are mounted, as shown in Fig. 5. By this construction the checking cylinder 24 cannot rotate faster proportionately than the spindle 47, and consequently the rate of progress of the tape bears a constant relation to the rate of operation of said polyphase meter, which operates as a governor or controlling device for regulating the progress of the tape. The rate of operation of the constant speed motor 27 is such that it always tends to rotate the rewinding cylinder 22 faster than the tape is permitted to move by the meter E, so that the burden of moving the tape never falls upon said meter. It will be apparent, therefore, that the distance traveled by the tape during any predetermined interval, say a half hour, will represent the vector quantity O Q, or the true energy consumption during such interval as measured by the meter E.

The vector quantity P O, representing the reactive component of apparent energy during the same time interval, is measured by means of a stylus 49 carried at the lower end of a rack bar 50 which is movable vertically, or perpendicularly to the line of travel of the tape, as best shown in Fig. 5. This rack bar is mounted in suitable guides (not shown) carried by the plates 18, 19, so that it is freely movable vertically to carry the stylus 49 longitudinally of and over the axis 51 of the cylinder 23, and it is moved upward by mechanism very similar to that which drives the rewinding cylinder 22. Such mechanism comprises a constant speed motor 52, the armature shaft 53 of which bears a worm 54 which meshes with a worm wheel 55. Said worm wheel is mounted on a shaft 56 which carries two worms 57, 58, as shown in Fig. 5, the latter worm meshing with a worm wheel 59 mounted on a shaft 60 which corresponds with the shaft 31 in that it carries a clutch member 61 adapted to cooperate with a clutch member 62 similar to the clutch member 35, and carried by a shaft 63 which carries pinions 64, 65. The latter pinion normally meshes with the teeth of the rack bar 50, but is temporarily movable out of engagement therewith for resetting purposes as hereinafter described. The motor 52 manifestly will tend to rotate the shaft 63 at a constant speed and, therefore, to move the rack bar 50 upward at a constant rate, or in other words will exert a constant torque upon the shaft 63 tending to move said rack bar 50 upward. The rate of movement of the rack bar in an upward direction is, however, controlled from the polyphase meter R in the same way that the rate of travel of the tape is controlled by the polyphase meter E, this being accomplished by means of a worm 66 on the spindle 67 of the meter R, which worm meshes with a worm wheel 68 mounted on a shaft 69 which carries a pinion 70 meshing with the pinion 64. The latter pinion, therefore, cannot rotate faster than is permitted by the rate of operation of the meter R, and, therefore, the upward movement of the rack bar 50 and stylus 49 is always proportional to the reactive component of the apparent energy measured by the meter R, and corresponds with the vector quantity P O during any predetermined interval. It will also be apparent that if the tape travels during any such interval the line marked by the stylus 49 will correspond with the vector quantity P Q, and will represent the approximate integral or vector difference of the two vectors O P and O Q over such time interval.

The rack bar 50 returns to its initial position by gravity at the end of each time interval, this being permitted by moving the pinion 65 out of engagement with the teeth of said rack bar. To this end that end of the shaft 63 which carries the pinion 65 is journaled in the vertical arm 71 of a bell crank lever 72 which is mounted on a pivot 72ᵃ as shown in Fig. 5. The horizontal arm 73 of said lever has connected to it one end of a spring 74, the other end of which is connected to a latch lever 75 mounted on a pivot 76, so that it is adapted to swing in a plane parallel with the rack bar 50. Said latch lever is provided in its upper margin with a notch 77 adapted to engage the lower end of the arm 71 when the latter is swung away from the rack bar 50. The arrangement is such that when the pinion 65 is in mesh with the rack bar 50 the lower end of the arm 71 rests on the upper margin of the latch lever 75 adjacent to the notch 77, but by swinging the said arm 71 away from the rack bar 50 the pinion 65 may be disengaged from said rack bar and the lower end of said arm will then engage the notch 77, the latch lever 75 being then moved upward by the spring 74. Said latch lever will then act to hold the arm 71 in the latter position, thereby holding the pinion 65 out of mesh with the rack bar 50 and permitting the said rack bar to drop to its initial position. When it approximately reaches the latter position it will operate to move the latch lever 75 downward out of engagement with the arm 71 through a laterally projecting pin 78 carried by the rack bar, as shown in Fig. 5, in position to strike the upper margin of said latch lever and move it down until the lower end of the arm 71 is released from said notch. The spring 74 will then act to return the pinion 65 into operative engagement with said rack bar. These operations occur practically instantaneously so that there is no appreciable interval between the beginning and end of the resetting operation, and therefore the performance of the meter is not interfered with.

Figures 9, 10, 11:
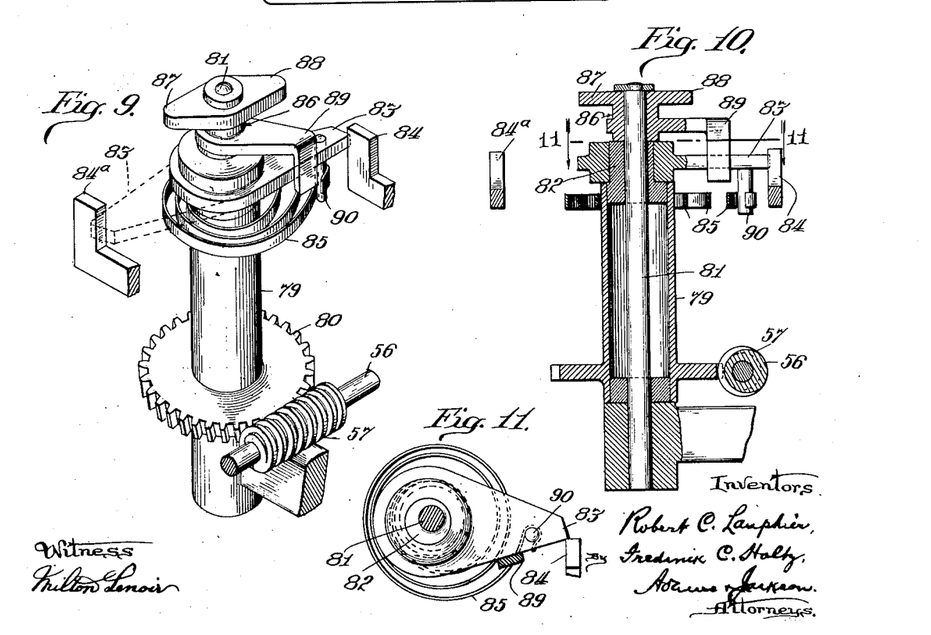
Fig. 9 is a perspective view showing a part of the resetting mechanism.
Fig. 10 is a central vertical section of the parts shown in Fig. 9.
Fig. 11 is a horizontal section on line 11—11 of Fig. 10.

The stylus is reset to its initial position at the end of each interval by mechanism driven by the constant speed motor 52 through the worm 57. Such mechanism comprises a shaft 79 which is constantly rotated in the same direction by the worm 57 through a worm wheel 80 fixed on said shaft, as best shown in Figs. 5 and 9. As shown in Fig. 10, the shaft 79 is tubular, and through it extends a shaft 81 that is journaled so as to be rotatable independently thereof, one of the bearings of the shaft 81 being in the form of an eccentric 82 which is secured to and rotates with the shaft 79. Loosely mounted on the eccentric 82 is a pawl 83 which is adapted to be intercepted by one or the other of two diametrically opposed stops 84, 84ᵃ suitably mounted in fixed positions, the arrangement being such that rotation of the shaft 79 and the eccentric 82 operates to move the pawl 83 longitudinally of itself, or substantially radially with reference to the shaft 81, with a range of movement which will withdraw the pawl 83 from engagement with the stop 84 or 84ᵃ by which it may have been arrested, and thereby permit the pawl to rotate through an arc of approximately 180° under the action of a spring 85 which tends to rotate said pawl about the shaft 81 as an axis. It will be evident, therefore, that when said pawl is in engagement with either stop rotation of the eccentric 82 will operate to withdraw it from engagement with said stop, and when such disengagement is effected the pawl will quickly swing around into engagement with the opposite stop, since its half rotation will reverse its relation to the eccentric, thereby projecting it far enough so that it will engage the other stop. The shaft 79 rotates slowly and is timed so that the pawl 83 is released at the end of each of the predetermined intervals referred to.

Mounted on the shaft 81 adjacent to the pawl 83 is a cam 86 having two similar arms 87, 88 at diametrically opposite points, so placed as to underlie the arm 73 of the resetting bell crank lever 72, as shown in Fig. 5. Said cam is also provided with an arm 89 which extends down alongside of the pawl 83 in position to be engaged by said pawl when the latter rotates. The result is that when the pawl 83 is released as above described it will swing through an arc of 180°, thereby moving one of the arms 87 or 88 into engagement with the arm 73 so as to rock the resetting lever and accomplish the resetting of the stylus in the manner above described. Normally the cam 86 stands with its longer axis parallel with the inner face of the arm 73, so that the action of said cam on said arm is momentary and after each actuation the resetting lever is left free to return to its operative position. The continued rotation of the shaft 79, to which one end of the spring 85 is connected, operates to rewind said spring, so that it is always operative. As shown in Figs. 9 and 10, said spring is connected with the pawl 83 by a pin 90. It will be noted that the resetting mechanism is actuated at the end of each of a series of time intervals which are not affected by the operation of either of the polyphase meters, so that regardless of the extent to which the tape or the stylus may have been moved during any such interval, at the expiration of a predetermined number of minutes or hours the stylus will be reset. The diagonal lines traced on the tape, therefore, correctly represent the vector sums over each of the several predetermined time intervals during which the meter as a whole is in use, and consequently the chart thus made furnishes an easy way of making the desired calculations of power consumption.

Figure 12:
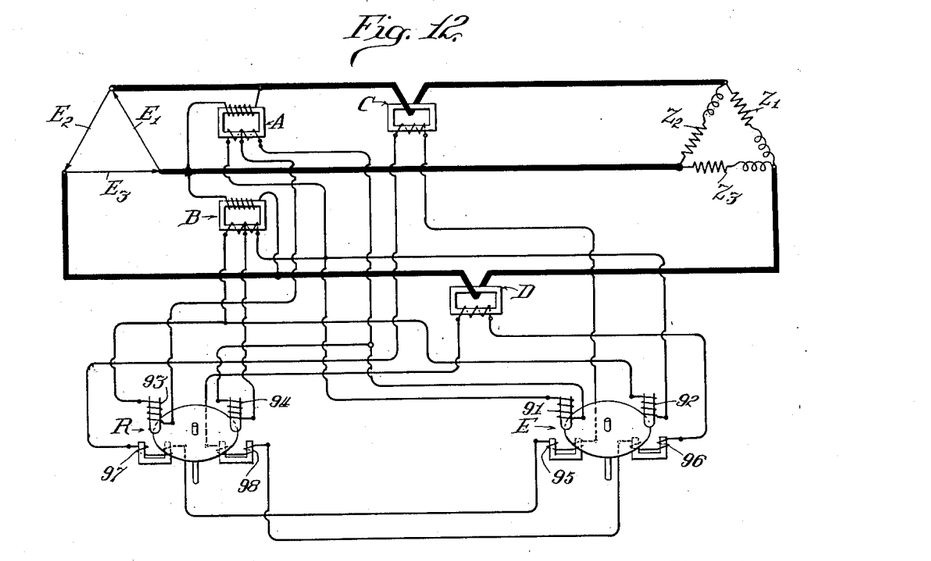
Fig. 12 is a diagram showing the arrangement of the circuits in the application of our improved apparatus to the measurement of the apparent energy of a polyphase alternating current system.

In the diagrammatic view Fig. 12 the circuits are sufficiently illustrated so that the several connections may be understood at a glance, and without tracing out the wiring in detail it is sufficient to say that said figure illustrates a three phase transmission system having voltages $E_1$, $E_2$, $E_3$ between phases, and delivering energy to the three impedances $Z_1$, $Z_2$ $Z_3$. A and B indicate potential transformers, and C and D current transformers. The secondary windings of the potential transformers are connected to the potential elements 91, 92 and 93, 94 of the polyphase meters E, R, while the secondary windings of the current transformers C, D are connected to the current windings 95, 96 and 97, 98 of said meters. The method of connection provides that the discs of the meter E shall rotate at a speed proportional to the true power delivered to the impedances $Z_1$, $Z_2$, $Z_3$, and that the discs of the meter R shall rotate at a speed which is proportional to the wattless power supplied. As this method of connection is old and well understood in the art, it is unnecessary to describe the wiring more in detail. In this connection it is suggested that, obviously, by appropriately rearranging the circuits the travel of the tape may be controlled by the polyphase meter R so that it operates at a speed proportional to the reactive component of apparent energy supplied, while the stylus is operated by the meter E which measures the true energy supplied. Such a rearrangement would of course be within the skill of any one familiar with the art and would not involve any departure from our invention.

So far as we are aware, we are the first in the art to provide an apparatus of the character described, in which the degree of movement of a movable record element is controlled by a meter, or equivalent variably actuated measuring instrument, acting as an escapement, or as an escapment controlling device, while the actuating power is supplied by an independent constantly acting motor element of any suitable type. Our invention therefore is not limited to the use of any particular escapement arrangement between each of the meters and the member controlled by it. Evidently a clock type of escapement suitably controlled by each of the meters could be used instead of the arrangement shown. We also believe ourselves to be the first in the art to provide an apparatus for such purpose comprising two polyphase meters in connection with a tape movable in a constant direction proportionately to one factor, corresponding during a given time interval with one vector, and a stylus or equivalent device movable at right angles to the direction of travel of the tape proportionately to the other factor, and corresponding during the same time interval with another vector, so that a record is made on the tape which represents approximately the summation of the two vector quantities during such time interval. Our invention, therefore, is generic in character, and the claims hereinafter made should be construed accordingly.

We have shown the embodiment of our invention mainly in a diagrammatic way, without illustrating many of the mechanical details which would enter into the construction of the instrument commercially, such as the guides for the rack bar 50 and the supporting devices for many of the operating parts, as those are mere details of construction which can be supplied by any competent mechanic familiar with the construction of meters or similar instruments, and their illustration is therefore believed to be unnecessary.

What we claim as our invention and desire to secure by Letters Patent, is—

1. An electrical instrument for recording vectorially the electrical components traversing an alternating current circuit, comprising a movable record element, a constantly-acting motor element tending to move said record element, an electric meter responding to the variations of one of said components, and means operatively connecting said meter with said record element whereby during the operation of said meter said record element is driven continuously by said motor element at a speed proportionate to the operation of said meter.

2. An electrical instrument for recording vectorially the electrical components traversing an alternating current-circuit, comprising a movable record element a constantly-acting motor element tending to move said record element, driving devices actuated by said motor element and connected with said record element, an electric meter responding to the variations of one of said components, and means operatively connecting said meter with said driving devices whereby during the operation of said meter said record element is driven continuously by said motor element in synchronism with said meter.

3. An electrical instrument for recording graphically the electrical components traversing an alternating current circuit, comprising a movable record element, a constantly-acting motor element tending to move said record element at a predetermined speed, an integrating electric meter responding to the variations of one of said components, and means operatively connecting said meter with said record element so that during the operation of said meter said record is driven continuously by said motor element but at a speed responding variably and directly with the variations of speed of said electric meter.

4. An electrical instrument for recording graphically the electrical components traversing an alternating current circuit, comprising a movable record element, a constantly-acting motor element tending to move said record element, driving devices actuated by said motor element and connected with said record element, said driving devices comprising a slippage connection, an electric meter responding to the variations of one of said components, and means operatively connecting said meter with said record element so that the energy for moving said record element is derived from said motor element but said record element is only allowed to move at a speed determined by said electric meter through the slippage of said slippage connection.

5. An electrical instrument for recording vectorially the electrical components traversing an alternating current circuit, comprising a movable record element, an electric meter responding to the variations of one of said components, a constantly-acting electric motor element tending to move said record element proportionately faster than the rate of operation of said meter, driving devices actuated by said motor element and operative to move said record element continuously during the operation of said meter, and connections between said meter and said record element arranged so that said meter operates as an escapement member to control the movement of said record element.

6. An instrument for recording kva. demand comprising a movable record element, a constantly-acting motor element, means including friction clutch mechanism connecting said motor element with said record element for driving the latter, an electric meter, and means operatively connecting said meter with said record element so that their respective degrees of movement will maintain a constant relation to each other.

7. An instrument for recording kva. demand comprising a movable record element, a constantly-acting motor element, an electric meter for controlling the degree of movement of said record element, and means including friction clutch mechanism for driving said record element from said motor element.

8. An instrument for recording vectorially the kva. demand on a circuit comprising a movable record element, a constantly-acting motor element, variably actuated electric meter, co-acting friction clutch members, one of said clutch members being operatively connected with said motor element and the other with said record element, and means operatively connecting said electric meter with the latter friction clutch member whereby the speed thereof will be controlled by said electric meter.

9. An instrument for graphically recording kva. demand comprising a movable record element, a constant speed motor, driving connections between said motor and said record element including a friction clutch, a variably actuated electric meter, and means operatively connecting said meter with said record element at the opposite side of said friction clutch member from said motor whereby the movement of said record element will be controlled by said meter.

10. An electrical instrument for recording vectorially the electrical components traversing an alternating current circuit, comprising a traveling tape, means tending to move said tape at a constant speed, an electric meter responding to the variations of one of said components, and means establishing a controlling relation between said meter and said tape for maintaining a constant relation between the respective degrees of movement of said meter and tape.

11. An electrical instrument for recording graphically the electrical components traversing an alternating current circuit, comprising a traveling tape, a cylinder over which said tape travels, means for preventing movement of the tape relatively to the surface of the cylinder, a constantly-acting motor element tending to advance the tape at a constant speed, an electric meter responding to the variations of one of said components, and means operatively connecting said meter with said cylinder whereby the movement of said tape is maintained in synchronism with the variations in the operation of said meter.

12. In an electric meter of the class described, the combination of a movable record tape, a cylinder on which said tape is adapted to wind, an electric motor element exerting a continuous torque on said cylinder tending to advance the tape at a substantially constant speed, a second cylinder over which said tape travels, means for preventing movement of the tape relatively to the surface of said second cylinder, a variably actuated electric meter, and motion transmitting means comprising worm gearing connecting said second cylinder with said electric meter whereby a constant relation between the respective degrees of movement of said electric meter and said tape is maintained.

13. An instrument for recording kva. demand, comprising a traveling tape, a cylinder over which said tape travels, means for preventing movement of the tape relatively to the surface of the cylinder, a constantly-acting motor element exerting a continuous torque tending to advance the tape at a constant speed, slippage means associated with said motor element for permitting said tape to be advanced at a speed proportionately slower than the speed of said motor element, an electric meter responding to the variations of an electrical component, and means operatively connecting said meter with said cylinder so that the movement of said tape responds directly to variations in the rate of operation of said meter.

14. An instrument for recording kva. demand comprising a traveling tape, a first cylinder over which said tape travels, a constantly-acting electric motor, driving means connecting said motor with said cylinder for transmitting movement to said tape, said driving means comprising a slippage connection permitting a variation of speed of said cylinder relatively to said motor, a second cylinder over which said tape travels, said second cylinder being provided with means for perforating the tape to prevent movement thereof relatively to the surface of the cylinder, an integrating electric meter, and means operatively connecting said meter with said second cylinder whereby the speed of travel of said tape is directly proportional to the variations of speed of said electric meter.

15. An instrument for recording kva. demand comprising a movable stylus, means tending to move said stylus at a constant speed, a variably actuated meter, and means operated by said meter for maintaining a constant relation between the respective degrees of movement of said meter and stylus.

16. An instrument for recording kva. demand comprising a vertically-movable stylus, means tending to move said stylus at a constant speed, a variably actuated meter, and means operated by said meter for maintaining a constant relation between the respective degrees of movement of said meter and stylus.

17. An instrument for graphically recording kva. demand comprising a movable stylus, means tending to move said stylus at a constant speed, a variably actuated meter, means operated by said meter for maintaining a constant relation between the respective degrees of movement of said meter and stylus, and means operated independently of said meter for resetting said stylus at the end of predetermined time intervals.

18. An apparatus of the character described comprising a vertically-movable stylus, means tending to move said stylus at a constant speed, an electric meter, means operated by said meter for maintaining a constant relation between the respective degrees of movement of said instrument and stylus, and means operated independently of said meter for resetting said stylus at the end of predetermined time intervals.

19. An apparatus of the character described comprising a record sheet, a support movable over the surface of said sheet and adapted to carry a record making device, a constantly-acting motor element tending to move said support in one direction, a resetting device for resetting said support to its initial position, an electric meter operating to control the movement of said support, and means operated by said constantly-acting motor element independently of said meter for actuating said resetting device to reset said support at the end of predetermined time intervals.

20. An apparatus of the character described comprising a vertically-movable rack bar adapted to support a marking device, a constantly-acting motor element tending to move said rack bar upwardly, a variably actuated electric meter operating to maintain a constant relation between the upward movement of said rack bar and the speed of said meter, and means actuated by said motor element for resetting said rack bar to its initial position at the end of predetermined time intervals.

21. An electrical recording apparatus of the character described comprising a vertically movable rack bar adapted to carry a marking device, a pinion meshing with said rack bar, a constantly-acting motor element, driving connections between said motor element and pinion including a friction clutch, and means operated by said motor element independently of said friction clutch for temporarily disconnecting said pinion and rack bar to permit the latter to return to its initial position.

22. An apparatus of the character described comprising a vertically movable rack bar adapted to carry a marking device, a pinion meshing with said rack bar, a constantly-acting motor element, driving connections between said motor element and pinion including a friction clutch, means operated by said motor element independently of said friction clutch for temporarily disconnecting said pinion and rack bar to permit the latter to return to its initial position, an electric meter, and means connecting said meter with said pinion independently of said friction clutch.

23. An apparatus of the character described comprising a movable record element, a constantly-acting motor element tending to move said record element, an electric meter governing the movement of said record element and a resetting device driven by said motor element and comprising a constantly-rotating shaft, an intermittently-rotating pawl, and means actuated by said pawl for temporarily disconnecting said record element from said motor element.

24. An apparatus of the character described comprising a vertically-movable rack bar adapted to carry a marking device, a bell-crank lever, a pinion supported by said bell-crank lever and movable into and out of operative engagement with said rack bar, a constantly-acting motor element for rotating said pinion, an electric meter governing the rotation of said pinion, an intermittently-rotating member adapted to actuate said bell-crank lever to move said pinion out of engagement with said rack bar, and means for actuating said intermittently-rotating member comprising a constantly-rotating shaft, an eccentrically-mounted pawl adapted to rotate independently of said constantly-rotating shaft, means operatively connecting said pawl with said intermittently-rotating member, and stops arranged to alternately intercept said pawl and be disengaged thereby incident to the eccentric movement thereof.

25. An apparatus of the character described, comprising a plurality of record elements movable independently of each other and cooperating to make a vectorial record, constantly-acting means tending to advance said record elements, a plurality of variably actuated electric meters, and devices operatively connecting said meters respectively with said record elements and operating to maintain constant the relation between the degree of movement of each of said record elements and the electric meter with which it is connected.

26. An apparatus of the character described comprising a plurality of record elements movable angularly relatively to each other and cooperating to make a vectorial record, constantly-acting means tending to advance said record elements, a plurality of measuring instruments, and means operated by each of said instruments for controlling the degree of movement of one of said record elements so that the degree of movement of such record element will maintain a constant relation to that of the instrument with which it is connected.

27. An apparatus of the character described comprising a plurality of movable record elements adapted to cooperate to make a vectorial record, a plurality of constantly-acting motor elements associated respectively with said record elements and tending to advance the same, a plurality of measuring instruments, and means controlled by each of said instruments for regulating the degree of movement of one of said record elements so as to maintain a constant relation between the movement of such record element and the instrument by which it is controlled.

28. An apparatus of the character described comprising a plurality of record elements movable angularly relatively to each other and cooperating to make a vectorial record, constantly-acting means tending to move said record elements, a plurality of variably actuated measuring instruments, means operated by each of said instruments for controlling the degree of movement of one of said record elements so that the degree of movement of such record element will maintain a constant relation to that of the instrument with which it is connected, and means for periodically returning one only of said record elements to its initial position.

29. An apparatus of the character described comprising a plurality of movable record elements adapted to cooperate to make a vectorial record, a plurality of constantly-acting motor elements associated respectively with said record elements and tending to advance the same, a plurality of measuring instruments, means controlled by each of said instruments for regulating the degree of movement of one of said record elements so as to maintain a constant relation between the movement of such record element and the instrument by which it is controlled, and means for periodically returning one only of said record elements to its initial position.

30. An apparatus of the character described comprising two alternating current meters adapted to measure respectively true energy and the reactive component of energy, a tape movable in a constant direction, a stylus movable over the tape at right angles to the direction of travel thereof, means operated by one of said meters for maintaining a constant relation between the registration thereof and the movement of said tape, and means operated by the other meter for maintaining a constant relation between the registration thereof and the movement of said stylus.

31. An apparatus of the character described comprising two alternating current meters adapted to measure respectively true energy and the reactive component of apparent energy, a tape movable in a constant direction, a stylus movable over the tape at right angles to the direction of travel thereof, means operated by one of said meters for maintaining a constant relation between the registration thereof and the movement of said tape, means operated by the other meter for maintaining a constant relation between the registration thereof and the movement of said stylus, and constantly-acting means tending to advance said tape and stylus.

32. An apparatus of the character described comprising two alternating current meters adapted to measure respectively true energy and the reactive component of apparent energy, a tape movable in a constant direction, a stylus movable over the tape at right angles to the direction of travel thereof, constant speed motors tending to advance said tape and stylus, means controlled by one of said meters for maintaining a constant relation between the respective degrees of movement of said meter and tape, and means operated by the other meter for maintaining a constant relation between the respective degrees of movement of the stylus and the latter meter.

33. An apparatus of the character described comprising two alternating current meters adapted to measure respectively true energy and the reactive component of apparent energy, a tape movable in a constant direction, a stylus movable over the tape at right angles to the direction of travel thereof, a constantly-acting means tending to advance said tape and stylus, means controlled by one of said meters for maintaining a constant relation between the respective degrees of movement of said meter and tape, means controlled by the other meter for maintaining a constant relation between the respective degrees of movement of the stylus and the latter meter, and means independent of said meters for resetting said stylus at the end of pre-determined time intervals.

34. An apparatus of the character described comprising two alternating current meters adapted to measure respectively true energy and the reactive component of apparent energy, a traveling tape, a stylus movable transversely of said tape, constant speed motors, means connecting said motors respectively with said tape and stylus including friction clutch devices, and means connecting said meters respectively with said tape and stylus and operating to maintain a constant relation between the respective degrees of movement of said tape and stylus and the meters with which they are respectively connected.

35. An apparatus of the character described comprising two alternating current meters adapted to measure respectively true energy and the reactive component of apparent energy, a traveling tape, a stylus movable transversely of said tape, constant speed motors, means connecting said motors respectively with said tape and stylus including friction clutch devices, means connecting said meters respectively with said tape and stylus and operating to maintain a constant relation between the respective degrees of movement of said tape and stylus and the meters with which they are respectively connected, and means operated by one of said motors independently of said meters for resetting said stylus at the end of predetermined time intervals.

36. In combination, an integrating watt meter for power component, an integrating watt meter for reactive component, a record sheet, a stylus cooperating therewith, means for advancing said record sheet in accordance with the measurement of one of said meters in one direction only, means for advancing said stylus across said record sheet in accordance with the measurement of the other of said meters, and means for periodically returning only said stylus to a zero position.

37. An apparatus for continuously recording the relative values of the reactive component, the power component and the apparent energy traversing an alternating current circuit comprising means for automatically advancing a record sheet in accordance with the integrated values of one of said components, means for automatically moving a recording stylus across said record sheet in accordance with the integrated values of the other of said components, and means for automatically and periodically returning only said stylus to a zero position, thereby determining the three angle points of a series of rightangle triangles the sides of which are respectively proportional to the average integrated values of power component, reactive component and apparent energy traversing the circuit during said periods.

38. In a system of alternating electric current distribution having a reactive load, the combination with an electric meter having windings subject to current and pressure of the system and arranged to cause motion proportional to the energy consumed; of a second electric meter having windings subject to current and pressure of the system and arranged to cause motion proportional to the reactive watts, a marking instrument having two complemental moving elements, one in the form of a recording surface and the other being adapted to effect markings upon said surface, two coupling means respectively individual to said meters for coupling them with said marking instrument elements whereby movements of said elements are controlled by said meters, restoring means individual to one of said marking instrument elements for restoring the latter to zero position, a constant speed electric motor supplied with current from the system and in operating relation to said restoring means, and mechanism periodically operated by the constant speed motor for releasing said coupling means and permitting said restoring means to restore said last mentioned marking instrument element to zero position.

39. An apparatus of the character described comprising two alternating current meters adapted to measure respectively true energy and the reactive component of energy, a marking instrument having two complemental moving elements, one adapted to mark the other, coupling means respectively individual to said meters for coupling them with said marking instrument elements, whereby movements of said elements are controlled by said meters, restoring means individual to one of said marking instrument elements for restoring the latter to zero position, and a constant speed electric motor having operating relation to said restoring means.

ROBERT C. LANPHIER.
FREDERICK C. HOLTZ.

CERTIFICATE OF CORRECTION.

Patent No. 1,708,972.            Granted April 16, 1929, to

ROBERT C. LANPHIER ET AL.

It is hereby certified that error appears in the printed specification of the above numbered patent requiring correction as follows: In the grant and in the heading to the printed specification the residence of the patentees was erroneously written and printed as "Chicago, Illinois", whereas said residence should have been written and printed as "Springfield, Illinois"; and that the said Letters Patent should be read with this correction therein that the same may conform to the record of the case in the Patent Office.

Signed and sealed this 18th day of June, A. D. 1929.

(Seal)                                                      M. J. Moore,
Acting Commissioner of Patents.

CERTIFICATE OF CORRECTION.

Patent No. 1,708,972.             Granted April 16, 1929, to

ROBERT C. LANPHIER ET AL.

It is hereby certified that error appears in the printed specification of the above numbered patent requiring correction as follows: In the grant and in the heading to the printed specification the residence of the patentees was erroneously written and printed as "Chicago, Illinois", whereas said residence should have been written and printed as "Springfield, Illinois"; and that the said Letters Patent should be read with this correction therein that the same may conform to the record of the case in the Patent Office.

Signed and sealed this 18th day of June, A. D. 1929.

(Seal)

M. J. Moore,
Acting Commissioner of Patents.